(12) United States Patent
Provence

(10) Patent No.: US 7,867,429 B2
(45) Date of Patent: Jan. 11, 2011

(54) PROCESS AND DEVICE FOR BENDING A SHEET OF SYNTHETIC MATERIAL FILLED WITH ALUMINA TRIHYDRATE

(75) Inventor: Francois Provence, Metz (FR)

(73) Assignee: Crea Diffusion, Solgne (FR)

( * ) Notice: Subject to any disclaimer, the term of this patent is extended or adjusted under 35 U.S.C. 154(b) by 0 days.

(21) Appl. No.: 12/706,697

(22) Filed: Feb. 16, 2010

(65) Prior Publication Data

US 2010/0140848 A1   Jun. 10, 2010

Related U.S. Application Data

(62) Division of application No. 11/258,824, filed on Oct. 26, 2005, now abandoned.

(51) Int. Cl.
B29C 53/04 (2006.01)

(52) U.S. Cl. .................. 264/316; 264/313; 264/322; 264/339

(58) Field of Classification Search .................. 264/313, 264/316, 319, 320, 322, 339
See application file for complete search history.

(56) References Cited

U.S. PATENT DOCUMENTS

| | | | | |
|---|---|---|---|---|
| 2,648,370 | A * | 8/1953 | Beach | 156/223 |
| 3,668,033 | A | 6/1972 | Evans | 156/212 |
| 4,187,273 | A | 2/1980 | Stratis | 264/322 |
| 5,236,658 | A * | 8/1993 | Ford | 264/553 |
| 5,486,324 | A | 1/1996 | Klein, Jr. | 264/138 |
| 5,529,480 | A | 6/1996 | Ross et al. | 425/394 |
| 5,549,862 | A | 8/1996 | Vail | |
| 5,747,154 | A | 5/1998 | Minghetti et al. | |
| 6,040,045 | A | 3/2000 | Alfonso et al. | 428/327 |
| 6,110,313 | A | 8/2000 | Ford | |
| 2003/0017311 | A1 | 1/2003 | Garitano | 428/195 |

FOREIGN PATENT DOCUMENTS

NL   1001066 C1   11/1995

OTHER PUBLICATIONS

Fine Woodworking and Bending Wood The Taunton Press 1945 ISBN 978-0-918894-29-7 p. 32.*
Fine Woodwoking and Bending Wood The Taunton Press 1945 ISBN 978-0-918804-29-7 p. 32.
Frame, Stem & Keel Repair Peter Spectre Woodenboat Publications 1996 ISBN 0-937822-42-6 p. 92.

* cited by examiner

Primary Examiner—Richard Crispino
Assistant Examiner—Martin Rogers
(74) Attorney, Agent, or Firm—Stephen Bongini; Fleit Gibbons Gutman Bongini & Bianco PL

(57) ABSTRACT

A process is provided for bending a board in synthetic material filled with more than 20% by weight of alumina trihydrate in a methyl methacrylate matrix: a section of the board is heated so that it can be bent; the section to be bent is bent while holding the convex upper surface of the board such that it does not become elongated. Also provided are a device for implementing such a process, and a bent board obtained by such a process.

18 Claims, 1 Drawing Sheet

PROCESS AND DEVICE FOR BENDING A SHEET OF SYNTHETIC MATERIAL FILLED WITH ALUMINA TRIHYDRATE

CROSS-REFERENCE TO RELATED APPLICATIONS

This application is a divisional of prior U.S. application Ser. No. 11/258,824, filed Oct. 26, 2005, now abandoned. The entire disclosure of U.S. Application Ser. No. 11/258,824 is herein incorporated by reference.

Additionally, this application is based upon and claims priority from prior French Patent Application No. 04 11565, filed Oct. 29, 2004, the entire disclosure of which is herein incorporated by reference.

FIELD OF THE INVENTION

The invention concerns a process and device for bending a sheet of synthetic material filled with alumina trihydrate in a methyl methacrylate matrix.

BACKGROUND OF THE INVENTION

A material sold under the name Corian® is sometimes used in the manufacture of bathroom and kitchen furnishings. This synthetic material reproduces the appearance of stones such as marble or granite. It is formed from a methyl methacrylate polymer filled with pigmented alumina trihydrate. The proportion of filling can vary from 20 to 85% of the weight, but preferably exceeds 60%. Document U.S. Pat. No. 3,847,865 describes the manufacture and the properties of such a material.

This material can be worked using conventional joinery methods. It can also be thermoformed. The possibilities of hot-bending the material are however limited due to the risks of crazing and discoloration of the material in the event of excessive bending. This is why the supplier recommends not exceeding a bend radius of 4 to 6 times the thickness of the sheet of material.

Document U.S. Pat. No. 5,486,324 proposes producing a countertop in Corian with a downturned edge at the front and an upturned edge at the rear of the countertop, with bend radii relative to the thickness of the board exceeding the limits mentioned above. To achieve this, it proposes cutting a groove to reduce the thickness of the board along the length of the bends between the main body of the countertop and the edges, and then to hot-bend the material.

However, although a board with a tight bend radius is obtained in this manner, the countertop is weakened due to the local reduction in thickness.

SUMMARY OF THE INVENTION

The invention aims at providing a process for bending a Corian board with a tight bend radius without the risk of discoloration, crazing or weakening the board.

With these aims in view, an object of the invention is a process for bending a board in synthetic material with a filling of more than 20% alumina trihydrate in a methyl methacrylate matrix, a process whereby the board section that is to be bent is heated and then bent. During bending, the top convex surface of the board is held such that its elongation is prevented.

By proceeding in the manner indicated, that is to say such that the material has no areas that become elongated during bending, no discoloration or crazing occurs, even if a bend radius of less than four times the thickness of the board is produced.

To achieve this, a flexible guide is placed along and held firmly against the upper surface without sliding during the bending stage. The guide provides a bearing surface for the upper surface and prevents elongation during bending.

The board is preferably heated from the underside. A temperature gradient is obtained through the thickness of the board. The underside area, which is hotter and therefore more malleable, flows more easily than the upper area, which reduces the bending stresses, particularly along the upper surface.

Another object of the invention is also a device for implementing the abovementioned bending process, this device comprises means of retaining the board such that it can be bent while holding the upper surface such that it does not become elongated.

The means of retention includes, for example, a flexible guide and means of holding the guide against the upper surface of the board.

In a particular arrangement, the holding means includes at least one pair of jaws to clamp the board along the length of a section to bend, the flexible guide being fixed to one of the upper jaws. When the jaws grip the board, the board is secured between them and can no longer slide. As the guide is secured to the upper jaw, a first joint is made between the board and the guide. If two pairs of jaws are used and positioned on either side of the section to bend, the two upper jaws are interconnected by the guide and the board is blocked between the jaws. This arrangement prevents the top surface of the board from becoming elongated during bending.

In another variant, the holding means comprises a flange against which one edge of the board abuts before the bending step. The flange is thus another means of blocking the guide with respect to the top surface of the board.

In a particular arrangement, the device comprises a bending beam mounted such that it can move between an initial position in which the bending beam is above the guide, and a final position in which the beam has driven the guide in a bending movement by applying pressure to the flange.

In a particular application, the upper jaw comprises a bearing surface provided to apply against the board, the flexible guide being offset from the bearing surface of thereby allowing a boss to form along the length of the upper jaw during the bending step. One can thus obtain a board on which the boss retains any liquid that might have spilled onto the horizontally positioned top surface of the board. The boss forms in the space left free beneath the guide and into which the board material can creep during the bending operation.

Another object of the invention is also a bent board obtained by the previously described process.

Such a board is of particularly interest when the bend radius of the underside is between one and four times the thickness of the board. These bend radius values are smaller than those that could be obtained until now without the appearance of whitening or crazing.

BRIEF DESCRIPTION OF THE DRAWINGS

The invention will be better understood, and particularities and advantages will become apparent on reading the following description, which makes reference to the appended drawings, in which.

DETAILED DESCRIPTION OF PREFERRED EMBODIMENTS

Preferred embodiments of the present invention will be described in detail hereinbelow with reference to the attached drawings.

Figure 1:
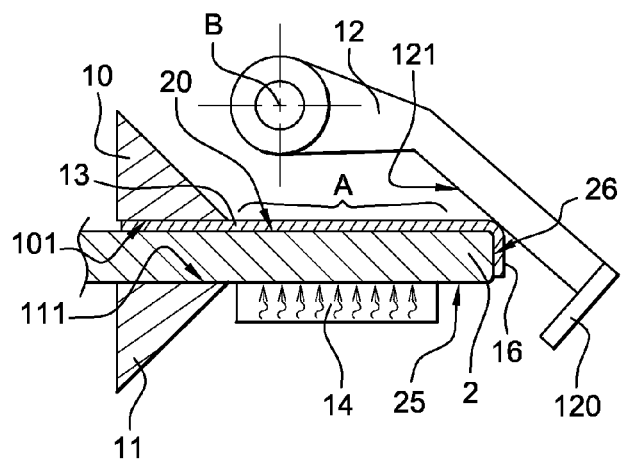
FIG. 1 is a cross-sectional schematic view of a device in conformity with the invention, in a position before bending.
Figure 2:
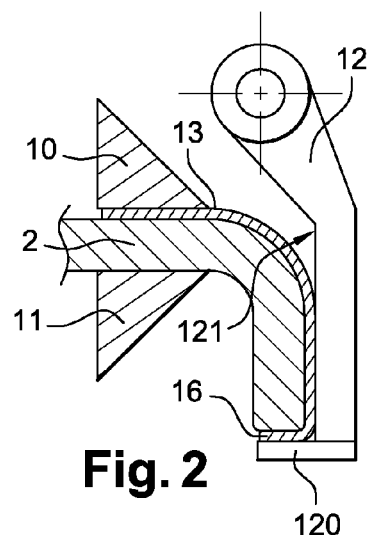
FIG. 2 is a view similar to FIG. 1 after bending.

A first method of producing a device in accordance with the invention is shown in FIGS. 1 and 2. This device comprises an upper jaw 10 and a lower jaw 11 between which is clamped a board 2 that is to be bent. Jaws 10, 11 are actuated by clamping means, not illustrated, for example by hydraulic jacks in a conventional manner. A guide 13 is secured to the upper jaw 10 and extends along a bearing surface 101 of the upper jaw 10. The guide 13 is for example a steel sheet of thickness between 0.2 and 0.4 mm.

The guide 13 is extended by a flange 16 running parallel to the upper jaw 10, perpendicularly to the face of the guide 13 and, and towards the lower jaw 11.

The bending device comprises, among other things, a beam 12 that pivots around a shaft B parallel to the jaws 10, 11, between an initial position, illustrated in FIG. 1, and an advanced position, illustrated on FIG. 2. The beam 12 comprises a working face 121 which is in contact with guide 13 at the flange 16 when the beam 12 is in the initial position. Beam 12 moreover comprises a second flange 120 that extends parallel to the pivoting axis B of the beam 12, perpendicular to the working face 121, and directed towards jaws 10, 11. When the beam 12 is in the advanced position, the flange 16 of guide 13 bears against the flange 120 of the beam, and guide 13 is partially in contact with the working face 121. Guide 13 then displays a bend between the upper jaw 10 and the working face 121, through an angle of about 90°.

The device moreover comprises retractable means of heating 14, to heat a surface in the continuation of a bearing surface 111 of the lower jaw 11.

When this device is used, a Corian board 2 is placed between jaws 10, 11 of the bending device such that an edge 26 of board 2 abuts against the flange of the guide. After tightening the jaws 10, 11 around board 2, for example with a pressure of 20 to 30 kN/m, the heating means 14 are switched on to heat the Corian board from the underside 25 opposing the upper side 20 which is in contact with the guide 13. Once the temperature of the upper side 20 has reached a predetermined threshold, between 135 and 155° C. for example, typically 145° C., the means of heating is retracted and the beam is made to move from the initial position to the advanced position. During the bending phase, the upper side 20 of the board remains in contact with the guide 13 while the edge 26 of the board is blocked against the flange 16 of guide 13. As a result of this, the upper side of the board does not suffer any elongation. Guide 13 bends elastically roughly through an arc of a circle.

By proceeding in this manner, it has been observed that the upper side 20 of Corian boards of 12.5 mm thickness, after cooling, displayed no discoloration or crazing in spite of having a bend radius of 25 mm in the upper surface.

Figure 3:
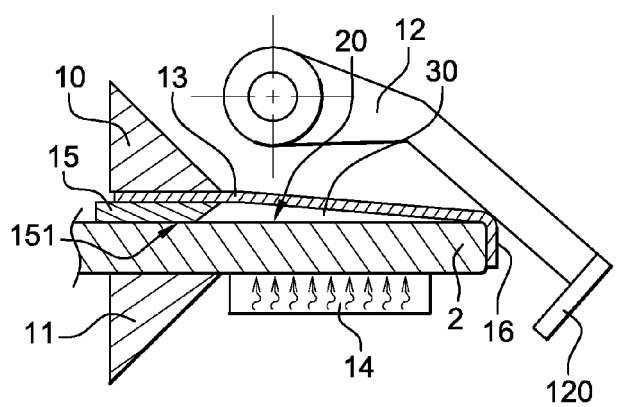
FIG. 3 is a view similar to 1 of a device in conformity with a second method of production of the invention, in a position before bending.
Figure 4:
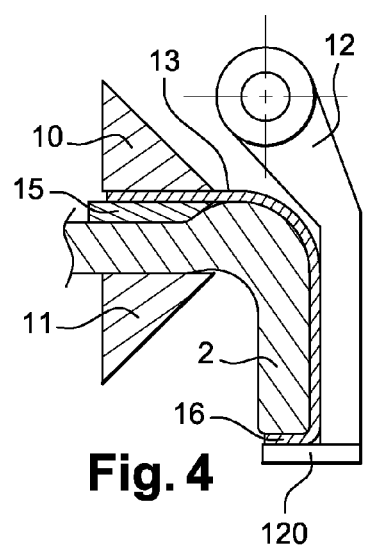
FIG. 4 is a similar view to FIG. 3 after bending.

In a second method of producing the invention, shown in FIGS. 3 and 4, the upper jaw 10 is modified with respect to that of the first method of production in that a shim 15 is added to the guide 13 on the bearing surface 101 of upper jaw 10.

Thus, the contact with the top surface 20 of board 2 in the initial position is made through a clamping surface 151 of shim 15. A space 30 is left free along the edge of the upper jaw 10, between guide 13 and the top surface 20 of board 2.

When board 2 is bent by the device in accordance with the second method of production, the board creeps into space 30 and thereby creates a boss 23 on board 20. The shape of shim 15 along boss 23 can be adapted to the desired shape of the boss 23.

Corian boards of 12.5 mm thickness were bent with a 3-mm thick shim resulting in a top surface bend radius of 25 mm. No signs of discoloration or crazing were observed on these boards.

Figure 5:
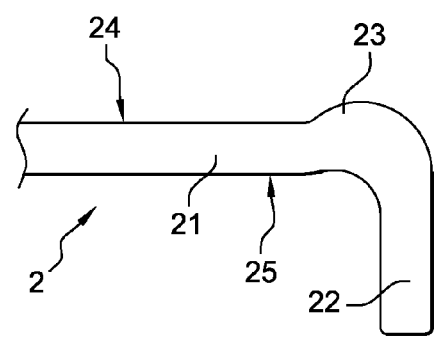
FIG. 5 is a cross-sectional view of a board bent using the device illustrated in FIGS. 3 and 4.

FIG. 5 shows an example of a product obtained by the process according to the invention using the second method of producing the device. This product is, for example, a countertop 2 for bathroom facilities. This countertop 2 comprises a main surface 24 designed to be installed horizontally, and a downturned edge 22, obtained by bending the board, creating a fascia at the front of the countertop. The main surface 24 ends with the boss 23 that limits the flow of any liquid spilled on the main surface 24 towards the downturned edge 22.

With both methods of producing the devices, it is possible to heat the board before it is placed between the jaws. The means of heating can be radiating elements or a base heated by electrical heating elements placed in contact with the area to heat.

The invention is not limited to the methods of production given purely as examples. The bending angle is not necessarily 90°, but can vary from 10° to 180°. The thickness of the boards can be smaller or larger.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for using a bending device to bend a synthetic material board filled with more than 20% alumina trihydrate in a methyl methacrylate matrix, the bending device comprising systems for clamping the board so that an upper surface of the board is held firmly so as to prevent elongation of the upper surface of the board during bending, the systems for clamping the board comprising a flexible guide and at least one pair of jaws to clamp the board along the length of an edge of the section to bend, an upper one of the jaws comprising a bearing surface intended to apply against the board, the method comprising the steps of:

heating a section of the board that is to be bent; and bending the section of the board to be bent so as to allow the board to creep into space between the flexible guide and the upper surface of the board and create a boss on the board along the length of the upper jaw, wherein the upper jaw comprises the bearing surface intended to apply against the board, and the flexible guide is offset from the bearing surface so as to allow the boss to be created along the length of the upper jaw during the bending step.

2. The method in accordance with claim 1, wherein during the bending step, the upper surface of the board is firmly constrained such that the upper surface of the board cannot be elongated during bending so as to prevent discoloration or crazing of the board that is filled with more than 20% alumina trihydrate.

3. The method in accordance with claim 1, wherein the flexible guide is secured to the upper jaw.

4. The method in accordance with claim 1, wherein the systems for clamping the board further comprise a flange against which an edge of the board is intended to abut before the bending step is performed.

5. The method in accordance with claim 4, wherein the bending device further comprises a bending beam mounted to move between an initial position in which the bending beam is above the flexible guide, and an end-position in which the beam has imparted a bending movement to the flexible guide by applying pressure to the flange.

6. The method in accordance with claim 1, wherein the board is filled with more than 60% alumina trihydrate.

7. The method in accordance with claim 1, wherein the board is heated from the underside.

8. The method in accordance with claim 1, wherein in the bending step, the board is bent such that a bend radius of the underside surface of the board is between one and four times the thickness of the board.

9. A method for using a bending device to bend a synthetic material board filled with more than 20% alumina trihydrate in a methyl methacrylate matrix, the bending device comprising systems for clamping the board so that an upper surface of the board is held firmly so as to prevent elongation of the upper surface of the board during bending, the method comprising the steps of:
heating a section of the board that is to be bent; and
bending the section of the board to be bent,
wherein the systems for clamping the board comprise:
a flexible guide; and
at least one pair of jaws to clamp the board along the length of an edge of the section to bend, the flexible guide being secured to an upper one of the jaws,
wherein the upper jaw comprises a bearing surface intended to apply against the board, at least a portion of the flexible guide being offset from the bearing surface such that, during the bending step, the board creeps into space between the flexible guide and the upper surface of the board so as to create a boss on the board along the length of the upper jaw.

10. The method in accordance with claim 9, wherein during the bending step, the upper surface of the board is firmly constrained such that the upper surface of the board cannot be elongated during bending so as to prevent discoloration or crazing of the board that is filled with more than 20% alumina trihydrate.

11. The method in accordance with claim 9, wherein the systems for clamping the board further comprise a flange against which an edge of the board is intended to abut before the bending step is performed.

12. The method in accordance with claim 11, wherein the bending device further comprises a bending beam mounted to move between an initial position in which the bending beam is above the flexible guide, and an end-position in which the beam has imparted a bending movement to the flexible guide by applying pressure to the flange.

13. The method in accordance with claim 9, wherein the board is filled with more than 60% alumina trihydrate.

14. A method for bending a rigid board, the method comprising the steps of:
heating a section of the board that is to be bent; and
bending the section of the board to be bent,
wherein the board comprises a synthetic material filled with more than 20% alumina trihydrate in a methyl methacrylate matrix, and
the bending step comprises the sub-steps of:
holding the flexible guide against an upper surface of the board, the flexible guide including a first flange that runs perpendicular to the upper surface of the board, and the flexible guide being held against the board such that an edge of the board abuts against the first flange; and
after the holding sub-step, bending the section of the board to be bent by applying pressure to the flexible guide while a portion of the upper face of the board remains in contact with the flexible guide and while the edge of the board is blocked against the first flange, at least a portion of the flexible guide being offset from the upper face of the board so as to allow the board to creep into space between the flexible guide and the upper face of the board and create a boss on the board.

15. The method in accordance with claim 14, wherein the bending sub-step comprises using a bending beam to apply pressure to the flexible guide.

16. The method in accordance with claim 14, wherein the bending sub-step comprises using a bending beam to apply pressure to the flexible guide, the bending beam including a second flange that extends perpendicular to a working face of the bending beam, and the second flange bearing against the first flange after the bending is completed.

17. The method in accordance with claim 14, wherein the board is filled with more than 60% alumina trihydrate.

18. The method in accordance with claim 14, wherein the flexible guide is one solid piece made of steel.

* * * * *